(12) United States Patent
Hanaoka et al.

(10) Patent No.: US 7,504,593 B2
(45) Date of Patent: *Mar. 17, 2009

(54) CONTINUOUS QUANTITATIVE DISCHARGING DEVICE AND MATERIAL BLENDING SYSTEM USING THE SAME

(75) Inventors: Kazunari Hanaoka, Hirakata (JP); Takayuki Okuda, Hirakata (JP); Hiroshi Hara, Hirakata (JP)

(73) Assignee: Kabushikikaisha Matsui Seisakusho, Osaka (JP)

( * ) Notice: Subject to any disclaimer, the term of this patent is extended or adjusted under 35 U.S.C. 154(b) by 4 days.

This patent is subject to a terminal disclaimer.

(21) Appl. No.: 11/631,022

(22) PCT Filed: Jun. 29, 2005

(86) PCT No.: PCT/JP2005/011947

§ 371 (c)(1), (2), (4) Date: Apr. 6, 2007

(87) PCT Pub. No.: WO2006/003935

PCT Pub. Date: Jan. 12, 2006

(65) Prior Publication Data
US 2007/0278018 A1 Dec. 6, 2007

(30) Foreign Application Priority Data
Jun. 30, 2004 (JP) ............................. 2004-194608

(51) Int. Cl.
*G01G 13/16* (2006.01)
(52) U.S. Cl. .......................... 177/59; 177/116; 222/77; 414/21
(58) Field of Classification Search .................... 222/55, 222/56, 77; 141/83; 177/59, 60–66, 116–122; 414/21

(56) References Cited

U.S. PATENT DOCUMENTS

| | | | | |
|---|---|---|---|---|
| 3,224,519 | A * | 12/1965 | Fletcher et al. | 177/210 R |
| 3,477,533 | A * | 11/1969 | Tolan et al. | 177/220 |
| 4,085,850 | A * | 4/1978 | Heltzel | 414/21 |
| 4,134,466 | A * | 1/1979 | Steele | 177/114 |
| 4,867,343 | A * | 9/1989 | Ricciardi et al. | 222/1 |
| 4,880,142 | A * | 11/1989 | Higuchi et al. | 222/56 |
| 5,143,165 | A * | 9/1992 | Hough | 177/59 |
| 5,143,166 | A * | 9/1992 | Hough | 177/128 |
| 5,262,598 | A * | 11/1993 | Stotler et al. | 177/229 |
| 5,423,455 | A * | 6/1995 | Ricciardi et al. | 222/1 |
| 6,196,417 | B1 * | 3/2001 | Johnson et al. | 222/1 |
| 7,323,644 | B2 * | 1/2008 | Hanaoka et al. | 177/60 |
| 2001/0038018 | A1 * | 11/2001 | Bell et al. | 222/58 |

* cited by examiner

Primary Examiner—Randy W Gibson
(74) Attorney, Agent, or Firm—William L. Androlia; H. Henry Koda

(57) ABSTRACT

A continuous quantitative discharging device comprising a material reserving chamber for storing material continuously supplied from a material supply means; a material storage tank having at a top a material inlet separated from said material reserving chamber for storing material fallen from said material reserving chamber and having at a lower part a discharge means capable of continuously and quantitatively discharging the stored material therefrom; a load cell type mass weighing part having a carrying arm secured to only said material storage tank in said material storage tank and supporting said carrying arm by a load cell provided on a support frame separated from said material storage tank in a non-contact state; and a controller for monitoring the weighed value of said load cell and controlling the discharge of material from said discharge means and/or the supply of material into said material storage tank.

12 Claims, 4 Drawing Sheets

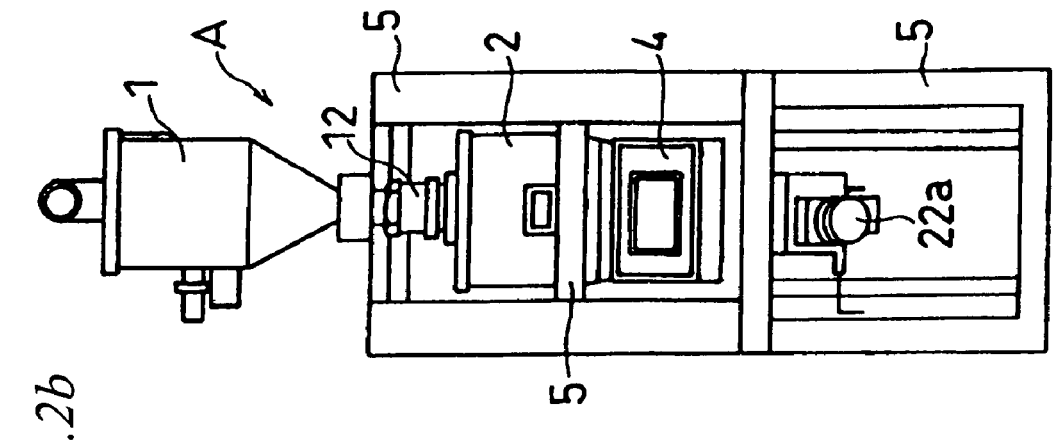
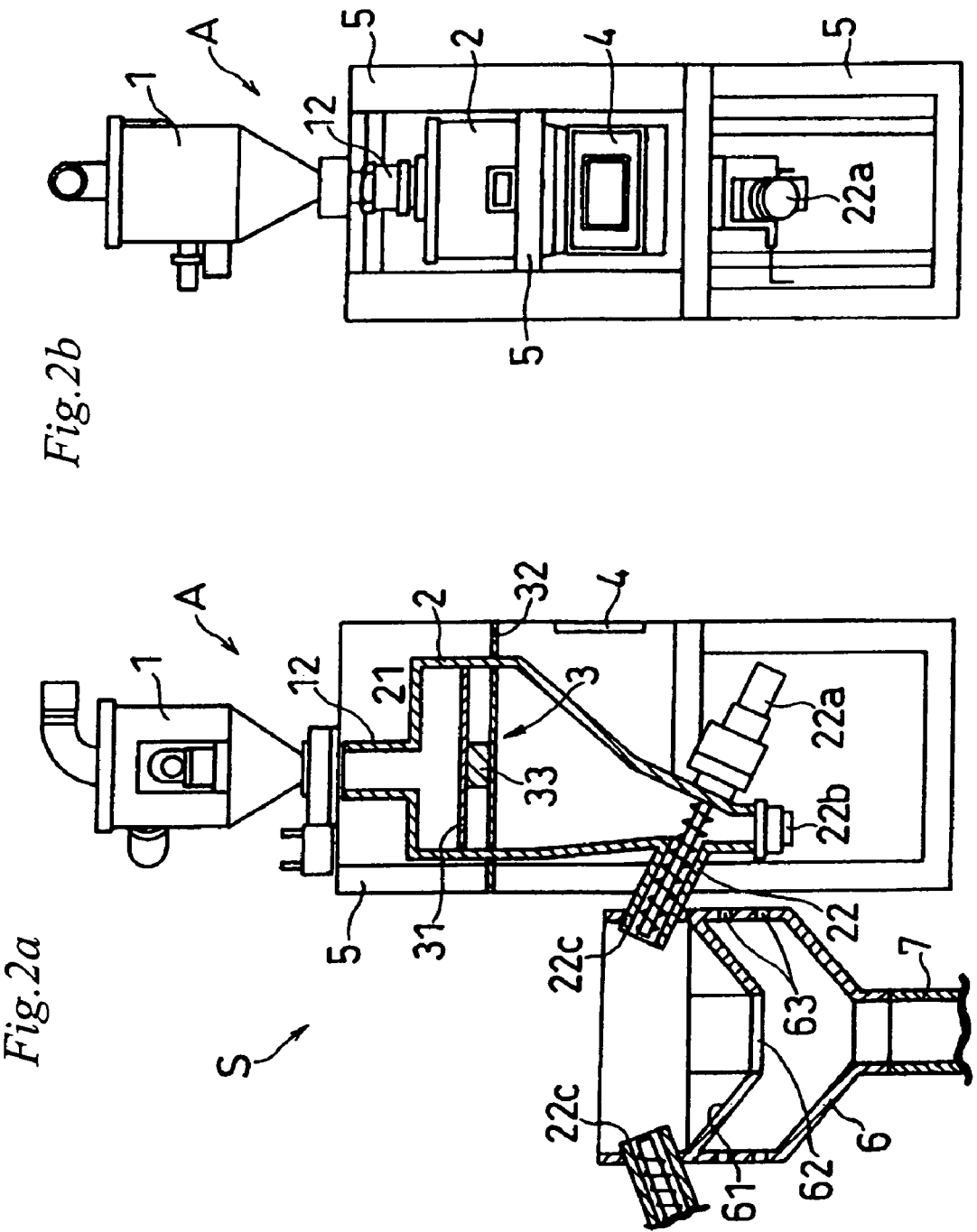

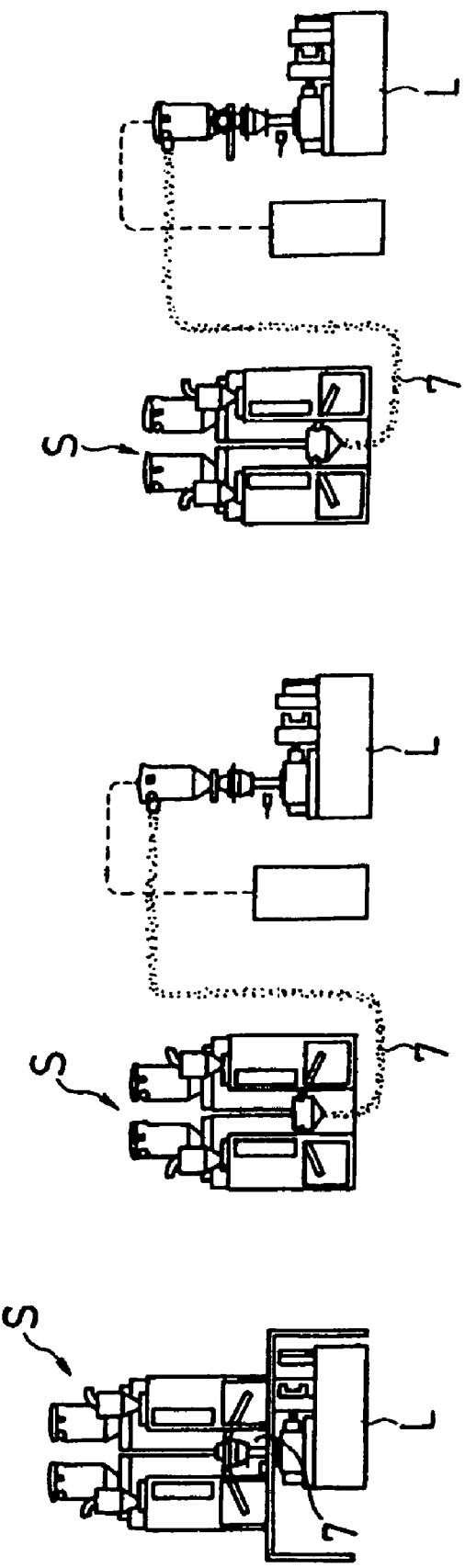

CONTINUOUS QUANTITATIVE DISCHARGING DEVICE AND MATERIAL BLENDING SYSTEM USING THE SAME

TECHNICAL FIELD

The present invention relates to a loss-in-weight type continuous quantitative discharging device capable of continuously discharging a fixed amount of material in which the weight of material stored in a material storage tank is measured, the stored material is continuously discharged with a discharge means, and the reduced weight of material is detected and a material blending system using the same.

BACKGROUND ART

A loss-in-weight system is well known as a means for continuously discharging a fixed amount of material.

One example of such a loss-in-weight type continuous quantitative discharging device comprises a measuring means provided with weighing parts in combination having a material storage tank supported with a load cell under a material reserving chamber for reserving material and a quantitative discharging device provided under the material storage tank, a material supply means capable of supplying material to the weighing parts, and a control means which measures the material supplied from the material supply means and controls the supply of the supply means accompanied with the measurement and which controls the quantitative discharge of the quantitative discharging device (for example, see patent document 1).

This continuous quantitative discharging device measures two material storage tanks with a measuring part thereof. While the material in one of material storage tanks is quantitatively discharged, the material is supplied in the other material storage tank to be measured by the measuring part thereof. Further, when a quantitative discharge from one of material storage tanks is finished, the material in the other material storage tank is capable of being quantitatively discharged.

According to such a prior continuous quantitative discharging device, two material storage tanks are alternately operated to discharge the stored material by turns so as to continuously discharge a fixed amount of material.

Patent Document: JP-A-5-322633

Problems to be Solved in the Invention

However, according to such a prior continuous quantitative discharging device, two material storage tanks are required and a measuring part is provided respectively for each tank, thereby complicating the structure and enlarging the system.

Further, such a continuous quantitative discharging device is constructed such that two material storage tanks and the quantitative discharging device are synchronized. Therefore, when large amount of material is to be continuously discharged, it requires to wait until the material in either one of the material storage tanks becomes ready to quantitatively discharge material or it requires to reduce the discharge amount or to slow the discharge speed so as to make the material storage tank capable of discharging a fixed amount, thereby causing such a problem that materials are not continuously and smoothly discharged.

Still further, each load cell for measuring two material storage tanks is constructed so as to support the outside which is apart from the center of gravity of the material storage tank, so that accidental errors may be caused when the weight of the material storage tank is measured, thereby causing such a problem that stored material is not accurately weighed.

In addition, a blending system in which a plurality of continuous quantitative discharging devices are provided becomes complicated and enlarged.

Discharge outlet from each continuous quantitative discharging device is fixed in such a blending system, so that the material is not balanced depending on the discharge amount and the kinds of discharge material, thereby making the blend ratio of material uneven.

The object of the present invention is to solve those problems and the present invention provides a continuous quantitative discharging device using the device reduced in overall size and capable of accurately, smoothly, and continuously discharging a fixed amount of material and mixing the discharged material at a uniform mixing ratio and also a material blending system using the same.

Means to Solve the Problems

In order to achieve the above objects, a continuous quantitative discharging device as set forth in claim 1 comprises a material reserving chamber for storing material continuously supplied from a material supply means; a material storage tank having at a top a material inlet separated from the material reserving chamber for storing material fallen from the material reserving chamber and having at a lower part a discharge means capable of continuously and quantitatively discharging the stored material therefrom; a load cell type mass weighing part having a carrying arm secured to only the material storage tank in the material storage tank and supporting the carrying arm by a load cell provided on a support frame separated from the material storage tank in a non-contact state; and a controller for monitoring the weighed value of the load cell and controlling the discharge of material from the discharge means and/or the supply of material into the material storage tank.

The device is simple in structure, which is characterized by measuring by only one material storage tank, thereby enabling downsizing of the whole device.

Further the weight of storage material in the material storage tank and the weight of discharge material discharged by the discharge means have no relation, are not synchronized, so that the material can be continuously supplied in the material storage tank while continuously discharging material even when large amount of material is continuously discharged, thereby achieving smooth and continuous discharge and supply.

Further, the support frame is separately provided in a non-contact state such that it is free from the influence of the weight of material storage tank and the carrying arm is supported with the load cell provided on the support frame, so that the entire weight of material storage tank is applied to the load cell in the material storage tank.

According to such a structure, the load cell can be provided near the center of gravity point of the material storage tank, thereby measuring the weight of supplied material at high accuracy.

According to the continuous quantitative discharging device as set forth in claim 2, the carrying arm as set forth in claim 1 has a pointed roof at the upper part thereof.

According to the continuous quantitative discharging device, the carrying arm in the material storage tank has the pointed roof at the upper part thereof, so that the supplied material is prevented from being accumulated on the carrying arm while being dropped via the carrying arm, thereby enabling accurate measurement of weight of supplied material.

According to the continuous quantitative discharging device as set forth in claim 3, the carrying arm of claim 1 or 2 is a structure orthogonal to a vertical axis at a center of gravity of the material storage tank and the load cell is provided directly under the substantial center of the structure.

According to this continuous quantitative discharging device, the load cell is provided directly under the substantial center of the carrying arm, therefore the carrying arm can be made in a desirable shape such as a straight line or cross shape.

According to a material blending system as set forth in claim 4, a plurality of the continuous quantitative discharging devices as set forth in any one of claims 1, 2 or 3 are provided, and a mixing chamber is connected at a discharge outlet end of each discharge means so as to contain the material discharged from the discharge outlets and the materials are mixed and blended in the mixing chamber to be transported to a molding machine with a transporting means.

According to this material blending system, the whole system can be downsized and the materials discharged from each continuous quantitative discharging device are mixed and blended in the mixing chamber to be transported, thereby preventing the material unmixed and obtaining uniformly mixed material.

According to the material blending system as set forth in claim 5, the controller of claim 4 controls the revolution speed of discharge means in such a manner that materials are simultaneously discharged at a fixed discharging speed and are stopped discharging simultaneously and a blended material with a fixed blending ratio and of fixed amount is transported to the molding machine.

According to this blending system, the materials are simultaneously discharged until the materials discharged from a plurality of discharge means reach to a fixed amount and they are stopped discharging simultaneously, thereby uniformly discharging the blended material with a fixed blend ratio from beginning to end.

According to the material blending system as set forth in claim 6, the controller of claim 4 or 5 is designed to control discharge of a fixed amount of material without slowing down the revolution speed of discharge means while assuming dropping amount of material from the discharge outlet end depending on the revolution speed of discharge means when discharge is stopped.

According to this blending system, the dropping amount is assumed without slowing down the revolution speed of discharge means and a fixed amount of material is discharged, thereby reducing the discharging time and enhancing the efficiency.

According to the material blending system as set forth in claim 7, the controller of claim 6 memorizes the dropping amount of material discharged from the discharge means at several times, the total dropping amount is divided by the times to obtain a compensation value, and next discharge amount is automatically controlled.

According to this blending system, the controller automatically controls next discharge amount while adding the compensation value, thereby reducing the accidental errors of the set discharge amount and the actual discharge amount caused by the dropped amount of material and executing accurate material discharge as set in advance.

According to the material blending system as set forth in claim 8, the mixing chamber of any one of claims 4-7 includes a baffle plate into which the material discharged from each discharge outlet end runs while being dropped therein and the material is designed to be stored after such running.

According to this blending system, the dropping material is scattered by the baffle plate, its travel direction is misordered, and several kinds of materials are mixed while being scattered, thereby making the discharge material more uniformly.

According to the material blending system as set forth in claim 9, in the system of claim 8, an air hole is formed at the side wall of the mixing chamber behind the baffle board for taking a secondary air for pneumatic transportation.

According to this blending system, the air hole is formed at the side wall of mixing chamber behind the baffle plate, so that the baffle plate prevents the adverse current of material in the mixing chamber, thereby achieving smooth intake of secondary air.

According to the material blending system as set forth in claim 10, in the system of any one of claims 4-9, the transportation amount of transporting means is controlled by the controller.

According to this blending system, the controller controls the transporting amount of transportation means, thereby enabling automation from material supply to transportation.

According to the material blending system as set forth in claim 11, in the system of any one of claims 4-10, each controllers provided for the continuous quantitative discharging device is capable of exchanging information each other via communication lines.

According to this blending system, mutual information exchange is enabled among the plurality of continuous quantitative discharging devices, so that all continuous quantitative discharging devices can be managed and controlled by means of a specified controller.

Further, the Internet may be used other than a wired or wireless communication.

Effect of the Invention

The present invention has the following effects.

The continuous quantitative discharging device as set forth in claim 1 has such a simple structure of measuring only one material storage tank, thereby downsizing the whole device.

Further the weight of storage material in the material storage tank and the weight of discharge material discharged by the discharge means have no relation and are not synchronized, so that the material can be continuously supplied in the material storage tank while continuously discharging material even when large amount of material is continuously discharged, thereby achieving smooth and continuous discharge and supply.

Further, the support frame is provided in a non-contact state with the material storage tank such that it is free from the influence of the weight of material storage tank and the carrying arm is supported with the load cell provided on the support frame, so that the entire weight of material storage tank is applied to the load cell in the material storage tank.

According to such a structure, the load cell can be provided near the center of gravity of the material storage tank, thereby measuring the weight of supplied material at high accuracy.

According to the continuous quantitative discharging device as set forth in claim 2, the carrying arm in the material storage tank has the pointed roof at the upper part thereof, so that the supplied material is prevented from being accumulated on the carrying arm while being dropped via the carrying arm, thereby enabling accurate measurement of weight of supplied material.

According to the continuous quantitative discharging device as set forth in claim 3, the carrying arm is a structure orthogonal to a vertical axis at a center of gravity of the material storage tank the load cell is provided directly under the substantial center of the carrying arm, thereby forming the carrying arm in a desirable shape such as a straight line or cross.

According to the material blending system as set forth in claim 4, the entire system can be simplified to be downsized. Further, the materials discharged from each continuous quantitative discharging device are mixed and blended in the mixing chamber to be transported, thereby preventing the material unmixed and obtaining uniform mixed material.

According to the blending system as set forth in claim 5, the materials are simultaneously discharged until the materials discharged from a plurality of discharge means reach to a fixed amount and they are stopped discharging simultaneously, thereby uniformly discharging the blended material with a fixed blend ratio from beginning to end.

According to the blending system as set forth in claim 6, the dropping amount is assumed without slowing down the revolution speed of discharge means and a fixed amount of material is controlled to be discharged, thereby reducing the discharging time and enhancing the efficiency.

According to the blending system as set forth in claim 7, the controller automatically controls next discharge amount while adding the compensation value, thereby reducing the accidental errors of the set discharge amount and the actual discharge amount caused by the dropped amount of material and executing accurate material discharge as set in advance.

According to the blending system as set forth in claim 8, the dropping material is scattered by the baffle plate, its travel direction is misordered, and several kinds of materials are mixed while being scattered, thereby making the discharge material more uniformly.

According to the blending system as set forth in claim 9, the air hole is formed at the side wall of mixing chamber behind the baffle plate, so that the baffle plate prevents the adverse current of material in the mixing chamber, thereby achieving smooth intake of secondary air.

According to the blending system as set forth in claim 10, the controller controls the transporting amount of transportation means, thereby enabling automation from material supply to transportation.

According to the blending system as set forth in claim 11, mutual information exchange is enabled among the plurality of continuous quantitative discharging devices, so that all continuous quantitative discharging devices can be managed and controlled by means of a specified controller.

BRIEF DESCRIPTION OF DRAWINGS

FIG. 2 is an explanatory view of which one part is outlined, FIG. 2a is a diagrammatic vertical sectional view in which one part of FIG. 1 is partially seen from the section, and FIG. 2b is a diagrammatical front view when the continuous quantitative discharging device A in FIG. 1 is seen from the controller.

FIG. 4a-4c show several embodiments when a material blending system S is attached to a molding machine.

REFERENCE NUMERAL

Figure 1:
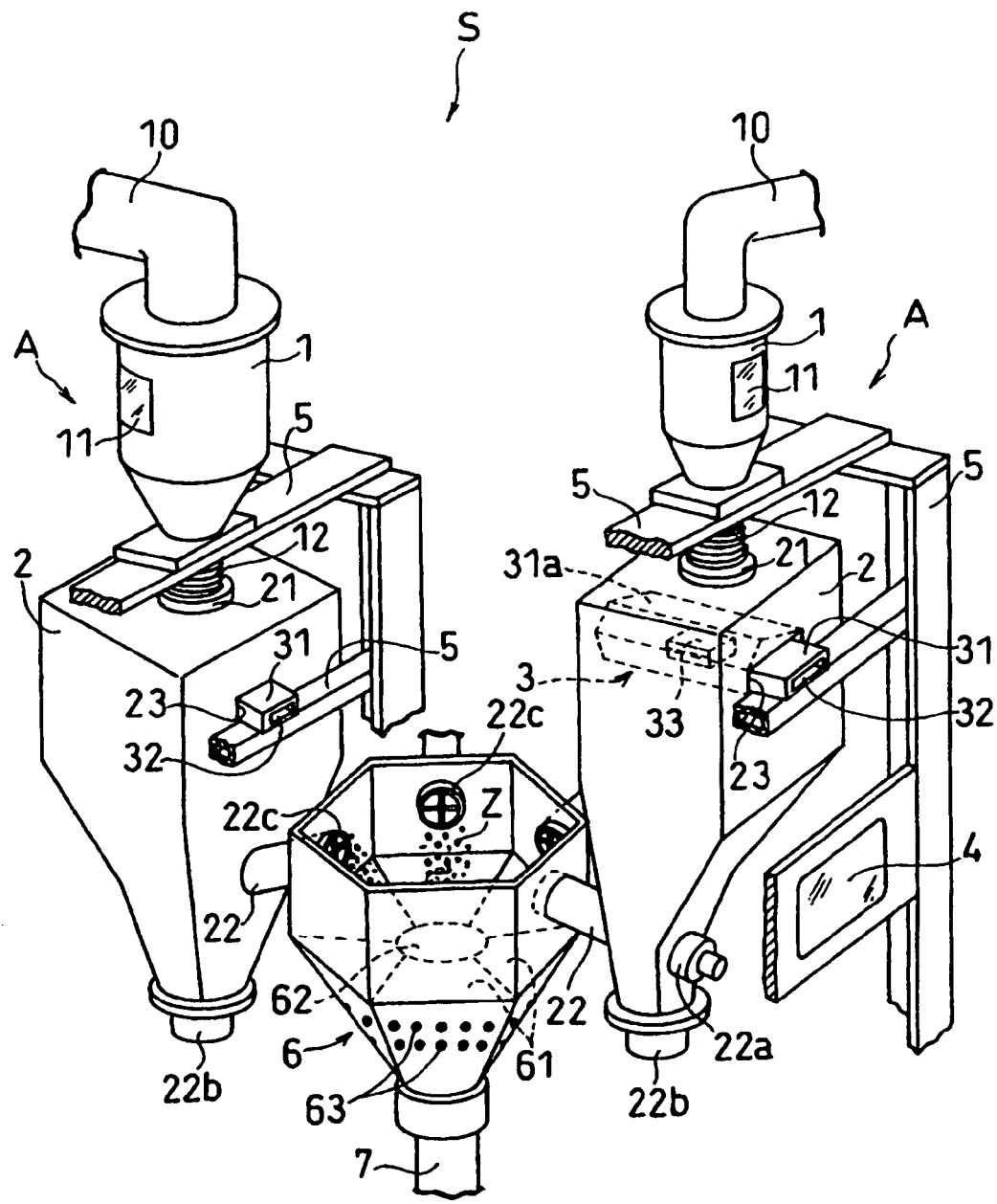
FIG. 1 shows a partially cutaway view in perspective of one embodiment of material blending system S using a continuous quantitative discharging device A according to the present invention.

A continuous quantitative discharging device
S material blending system
Z material
1 material reserving chamber
10 supply means
2 material storage tank
21 material inlet
22 discharge means
3 load cell type weighing part
31 carrying arm
31a roof
32 support frame
33 load cell
4 controller
6 mixing chamber
61 baffle plate
63 air hole
7 transportation means

BEST MODE FOR CARRYING OUT THE INVENTION

Now the present invention is explained referring to the attached drawings.

EMBODIMENT 1

FIG. 1 shows a partially cutaway view in perspective of one embodiment of material blending system S using a continuous quantitative discharging device A according to the present invention. FIG. 2 is an explanatory view of which one part is outlined, FIG. 2a is a diagrammatic vertical sectional view in which one part of FIG. 1 is partially seen from the section, and FIG. 2b is a diagrammatical front view when the continuous quantitative discharging device A in FIG. 1 is seen from the controller.

The continuous quantitative discharging device A of the present invention is explained.

The continuous quantitative discharging device A comprises a material reserving chamber 1 for storing material Z continuously supplied from a material supply means 10, a material storage tank 2 having at a top a material inlet 21 separated from the material reserving chamber 1 for storing material A fallen from the material reserving chamber 1 and having at the lower part a discharging means 22 capable of continuously and quantitatively discharging the stored material Z, a load cell type weighing part 3 having a carrying arm 31 connected only to the material storage tank 2 in the material storage tank 2 and supporting the carrying arm 31 by a load cell 33 provided on a support frame 32 separated from the material storage tank 2 in a non-contact state, a controller 4 monitoring the measured value of the load cell 33 and controlling the discharge of material of the discharge means 22 and/or the supply of material into the material storage tank 2, and an outer frame 5 for supporting the material reserving chamber 1, the material storage tank 2 and the controller 4.

The material Z may be any one of a solid material, a fluid material, a liquid material and the like, which can be discharged by the discharge means 22. This embodiment uses a powdered or granular material for resin including powder, granule, minute flake, short fiber and the like.

A blower is connected to the supply means 10 to continuously supply the material Z into the material reserving tank by the air flow.

A transparent window 11 is provided for the material reserving chamber 1 so as to see the suck material Z from outside.

The material reserving chamber 1 is fixed to the outer frame 5 and is also connected to the top of a flexible tube 12 provided thereunder via the outer frame 5.

The lower end of the flexible tube 12 is connected to the material inlet 21 formed on the material storage tank 2, however, the material reserving chamber 1 is supported in non-contact with the material storage tank 2 such that the tank 2 is free from the influence of the weight of chamber 1.

The supply amount of material Z into the material reserving chamber 1 and the supply amount of material Z from the material reserving chamber 1 to the material storage tank 2 are controlled by the controller 4.

The material storage tank 2 stores the material Z fallen from the material reserving chamber 1 through the flexible tube 12 and has the discharge means 22 capable of continuously and quantitatively discharging the material stored therein (also called as "stored material") at the lower part.

According to the discharge means 22, the stored material Z in the material storage tank 2 is continuously discharged out of the tank 2 by means of a rotary screw (not shown) having a driving means 22a. However, other discharge means 22 may be used if it can discharge a fixed amount of stored material Z outward therefrom.

The lower end of the material storage tank 2 may be closed, however, it may have a cover 22b to be opened or closed for executing maintenance of the discharge means 22 or for discharging the stored material Z as shown in FIG. 1 and FIG. 2.

The load cell type weighing part 3 is provided in the material storage tank 2 and has the following structure.

The carrying arm 31 is provided in the material storage tank 2 so as to be connected only to the material storage tank 2.

More concretely, openings 23 are formed at the facing side walls of the material storage tank 2, and the both ends of the carrying arm 31 are secured to the tank 2 by way of welding or other known way so as to be connected only to the material storage tank 2.

The carrying arm 31 may be a plate material, however, this embodiment uses a C-shape channel steel which opens downward to enhance the strength.

The peaked roof 31a is provided at the upper part of the carrying arm 31 as shown with dashed lines in FIG. 1. Because of such a roof 31a, the material Z fallen from the material inlet 21 is prevented from being deposited on the upper end of the carrying arm 31 when the material Z passes through the carrying arm 31.

The carrying arm 31 is provided such that a piece of C-shape steel penetrates the material storage tank 2 in a straight line. If the material storage tank 2 is made as a more larger capacity size, a plurality of carrying arms 2 may be provided in parallel or may be crossed in order to enhance the strength.

In any cases, the carrying arm 31 is preferably a structure installed in a horizontal direction orthogonal to the vertical axis at the center of gravity of the continuous quantitative discharging means A and the load cell 3, which is mentioned later, is provided directly under the substantial center of such a carrying arm 31.

The support frame 32 is separately supported from the material storage tank 2 in a non-contact condition as mentioned before.

The supporting frame 32 is made as a plate-like lever or a C-shape channel steel which is opened upward, each of which is disposed in parallel to the carrying arm 31 with space. The supporting frame 32 penetrates the openings 14 formed at the material storage tank 2 and both ends thereof are welded or bolted to the outer frame 5 formed around the material storage tank 2 in a non-contact state with the tank.

A measuring part (not shown) of the load cell is provided at a desirable position of the separated supporting frame 32, specifically around the center of gravity point of the material storage tank 2, and the carrying arm 31 is supported only by the load cell 33. If there causes gap between the load cell 33 and the carrying arm 31 or the supporting frame 32, a spacer may be provided so as to be filled therein.

Thus constructed load cell type weighing part 3 is provided such that the support frame 32 does not directly receive the load of material storage tank 2 in a non-contacted condition. The load cell 33 is provided on the support frame around the center of gravity and the carrying arm 31 is supported only with the load cell 3, so that the material storage tank 2 is suspended. The entire load of material storage tank 2 is directly received only by the load cell 33, therefore, the load cell 33 can measure the entire weight of material storage tank 2.

The value measured by the load cell 33 is always monitored by the controller 4.

The controller 4 is also connected to the driving means 22a of the discharge means 22, controls discharge of stored material Z from the discharge means 22, and controls the material Z supplied into the material storage tank 2 by controlling the supply amount of material Z into the material reserving chamber 1 or the supply amount of material Z from the material reserving chamber 1 to the material storage tank 2.

The controller 4 also memorizes the dropping amount of material Z discharged from the discharge means 22 at several times, and automatically controls next discharge amount using the compensation value which is the dropping amount value obtained by dividing the entire dropping amount at several times with the number of times.

The controller 4 automatically controls next discharge amount while adding the compensation value, so that the difference between the set discharge amount and the actual discharge amount caused by the dropping amount is reduced and a fixed amount of material Z set in advance can be accurately discharged.

Such a continuous quantitative discharging device A operates as follows.

Before the material Z is fed in the material storage tank 2, the material Z is stored only in the material reserving chamber 1 by the supply means 10, the load cell 33 receives the load of material storage tank 2 including the discharge means 22 and the load cell type weighing part 3. This load is set as weight 0 (zero).

Next, the weight of material Z to be discharged is inputted into the controller 4, a fixed amount of material Z is dropped to be continuously supplied into the material storage tank 2 from the material reserving chamber 1, and the material Z is smoothly stored in the material storage tank 2. The weight of stored material Z is added to the above weight 0, and the added weight is measured with the load cell 33, thereby measuring the weight of stored material Z.

After the fixed amount of material Z is measured, the driving means 22a of the discharge means 22 is driven to continuously discharge the stored material Z in the material storage tank 2.

When a fixed amount of material Z is already stored in the material storage tank 2 at the time of starting operation, the discharge means 22 is immediately operated.

The weight of continuously discharged material Z is the value to be subtracted from the weight of stored material Z in the material storage tank 2 on the contrary. The weight to be subtracted is observed by the load cell 33, thereby obtaining the weight of discharged material Z.

When the stored material Z in the material storage tank 2 becomes less than a fixed amount, the controller 4 drops the material Z stored in the material reserving chamber 1, refills a fixed amount of material in the material storage tank 2 to make the stored material Z in the material storage tank 2 over a fixed amount.

When the weight of discharged material Z becomes a preset value inputted as mentioned above, the controller 4 stops the discharge means 22, thereby discharging the inputted amount of material Z.

Accordingly, the present invention as mentioned above has a simple structure in which only one material storage tank 2 is measured, thereby downsizing the system.

The weight of stored material Z in the material storage tank 2 and the weight of discharged material Z by the discharge means 22 do not have any relation and are not synchronized. Therefore, even when a large amount of material Z is continuously discharged, the material can be continuously supplied in the material storage tank 2 while continuously discharging the material Z therefrom, thereby achieving smoothly continuous discharge and supply and enhancing the operational efficiency.

Next, the material blending system S using the continuous quantitative discharging device A according to the present invention is explained.

In the material blending system S, a plurality of the above-mentioned continuous quantitative discharging devices A are provided, a mixing chamber 6 is connected at each discharge outlet end 22c of the discharge means 22 to contain the material Z discharged from the discharge outlet end 22c. The discharged material Z is mixed and blended in the mixing chamber 6 and the blended material Z is to be transported into a molding machine (not shown).

The different kinds of material Z and different weight of material Z are continuously discharged from each continuous quantitative discharging device A, and are mixed and blended in the mixing chamber 6 to be transported.

The mixing chamber 6 is downwardly narrowed and each discharge outlet ends 22c of a plurality of continuous quantitative discharging devices A is inwardly connected as shown in FIG. 1 and FIG. 2(*a*).

Under the discharge outlet end 22c a baffle plate 61 is provided with which the discharged material Z once collides while falling in the mixing chamber 6 and the material Z is dropped from a central discharge outlet 62 to be contained after colliding with the baffle plate 61.

The material Z falling from each discharge outlet end 21a is scattered because of the baffle plate 61 in the mixing chamber 6 to make the traveling direction of material Z disordered and to make a plurality of materials Z mixed while being scattered. Thus, the discharged material can be uniformly mixed and such a uniformly mixed material Z can be transported into a molding machine (not shown) by means of a transportation means 7.

Further, a plurality of air holes 63 are provided at the side wall of the mixing chamber 6 behind the baffle plate 61 for taking into a secondary air for pneumatic transportation.

When a secondary air is taken in, the baffle plate 61 serves to prevent the reverse flow of material in the mixing chamber 6, thereby smoothly taking in a secondary air.

In the figure, the top of the mixing chamber 6 is opened so as to easily understand the inside of the mixing chamber 6, however, it goes without saying that the top is closed with a cover (not shown) in order to take in the secondary air.

Such a material blending system S is operated as follows.

The operation of continuous quantitative discharging device A is the same as mentioned above, so it is omitted hereinafter.

Figure 3:
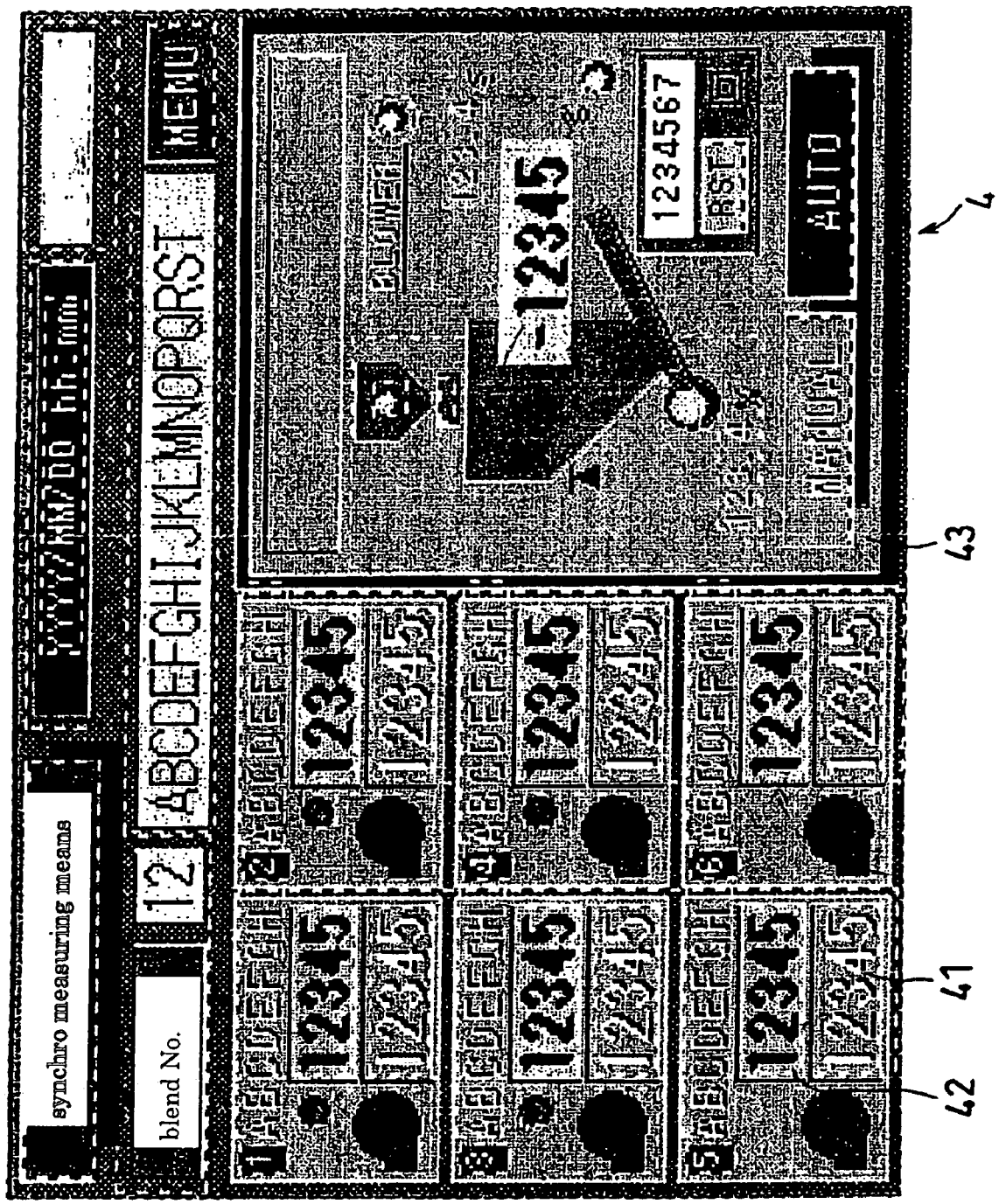
FIG. 3 is a front view showing an operation panel of controller.

FIG. 3 is a front view showing an operation panel of the controller 4. FIG. 4*a*-FIG. 4*c* show several embodiments when a material blending system S is attached to a molding machine.

Six continuous quantitative discharging devices A are capable of exchanging information with wires or via communication lines according to the controller 4.

For example, control boards each of which operates independently are provided for the controller 4 and are capable of being synchronously operated by connecting each of them with communication lines. Otherwise, a central control board may be optionally selected and one controller 4 can control the entire system with the central control board.

In case that an operator uses the controller 4 of the No. 5 continuous quantitative discharge device A, he sets the discharge amount of material Z on a set value display 41 at the bottom line.

He also sets the discharge amount of necessary continuous quantitative discharging device A among No. 1, No. 2, No. 3, No. 4 and No. 6.

After setting each discharge amount, each continuous quantitative discharging device A is operated as mentioned above to discharge the set amount of material into the mixing chamber 6.

The controller 4 controls the rotation number of driving means 22a of the discharge means 22 in such a manner that the material Z is simultaneously discharged at a fixed speed from a plurality of discharge means 22 and each discharging time is finished at the same time, thereby obtaining a uniform blended material from the beginning to the end while keeping a fixed mixing ratio.

The controller 4 is also designed to discharge a fixed amount of material Z assuming the dropping amount from the discharge outlet end when the discharge is stopped depending on the rotation number.

Specifically, the driving means 22a executes a test mode at the maximum rotation number before the actual drive so as to obtain the relational data of the dropping amount from the discharge means 22 and the maximum discharge amount, and the relational data of the discharge weight and the rotation number of discharge means 22. Thus, the dropping amount from the discharge device 22 at several rotation numbers and the discharge amount at several rotation numbers can be obtained by arithmetic operation and a PID control constant for controlling the discharge weight and the discharge means can be obtained by varying the rotation number of discharge means.

Accordingly, even if the rotation number of discharge means 22 is not required to slow down, a fixed amount of material Z can be discharged assuming the dropping amount, thereby reducing the discharge time and enhancing the efficiency.

A discharge amount display 42 at the upper line on the set value display 41 shows the discharge amount in the form of counter display. When the discharge amount shown on the discharge amount display 42 becomes the same as the display 41 as shown in the figure, the discharge is stopped.

The condition during discharge is shown on an operation display 43 provided for the controller 4 and how the material Z is discharged from the operating No. 5 continuous quantitative discharging device A can be visually acknowledged on the display 43.

A fixed amount of material Z thus discharged from each continuous quantitative discharging device A is uniformly mixed and blended in the mixing chamber 6 to be transported to the molding machine L by means of the transportation means 7. The transportation amount of transportation means 7 can be controlled by the controller 4.

The material blending system S of the present invention can be arranged depending on the type of molding machine L and installation environment as shown in FIG. 4a-FIG. 4c.

INDUSTRIAL APPLICABILITY

The present invention can be effectively used as a downsized continuous quantitative discharging device and a material blending system using the device.

The invention claimed is:

1. A continuous quantitative discharging device comprising:
   a material reserving chamber for storing material continuously supplied from a material supply means;
   a material storage tank having at a top a material inlet separated from said material reserving chamber for storing material fallen from said material reserving chamber and having at a lower part a discharge means capable of continuously and quantitatively discharging the stored material therefrom;
   a load cell type mass weighing part having a carrying arm secured at only both ends thereof to openings formed at facing side walls of said material storage tank such that said carrying arm is only connected to said material storage tank and supporting said carrying arm by a load cell provided on a support frame separated from said material storage tank in a non-contact state; and
   a controller for monitoring the weighed value of said load cell and controlling the discharge of material from said discharge means and/or the supply of material into said material storage tank.

2. The continuous quantitative discharging device as set forth in claim 1, wherein said carrying arm has a pointed roof at the upper part thereof.

3. The continuous quantitative discharging device as set forth in claim 1 or 2, wherein said carrying arm is a structure orthogonal to a vertical axis at a center of gravity of said material storage tank and said load cell is provided directly under the substantial center of said structure.

4. A material blending system wherein a plurality of said continuous quantitative discharging devices as set forth in any one of claims 1, 2 or 3 are provided, and wherein a mixing chamber is connected at a discharge outlet end of each discharge means so as to contain the material discharged from said discharge outlets and the materials are mixed and blended in said mixing chamber to be transported to a molding machine with a transporting means.

5. The material blending system as set forth in claim 4, wherein said controller controls the revolution speed of said discharge means in such a manner that materials are simultaneously discharged at a fixed discharging speed and are stopped discharging simultaneously and wherein a blended material with a fixed blending ratio and of fixed amount is transported to said molding machine.

6. The material blending system as set forth in claim 4 or 5, wherein said controller is designed to control discharge of a fixed amount of material without slowing down the revolution speed of discharge means while assuming dropping amount of material from said discharge outlet end depending on the revolution speed of discharge means when discharge is stopped.

7. The material blending system as set forth in claim 6, wherein said controller memorizes the dropping amount of material discharged from said discharge means at several times, the total dropping amount is divided by the times to obtain a compensation value, and next discharge amount is automatically controlled.

8. The material blending system as set forth in any one of claims 4-7, wherein said mixing chamber includes a baffle plate into which the material discharged from each discharge outlet end runs while being dropped therein and the material is designed to be stored after such running.

9. The material blending system as set forth in claim 8, wherein an air hole is formed at the side wall of said mixing chamber behind said baffle plate for taking a secondary air for pneumatic transportation.

10. The material blending system as set forth in any one of claims 4-9, wherein the transportation amount of said transporting means is controlled by said controller.

11. The material blending system as set forth in any one of claims 4-10, wherein each controllers provided for said continuous quantitative discharging device is capable of exchanging information each other via communication lines.

12. The continuous quantitative discharging device according to claim 1, wherein said carrying arm is provided horizontally.

* * * * *